INVENTOR.
JOHN C. KARCHER

United States Patent Office 3,377,152
Patented Apr. 9, 1968

3,377,152
PHENOLICS-ENRICHMENT OF HUMUS PLANT NUTRIENT
John C. Karcher, Dallas, Tex., assignor to Concho Petroleum Company, Dallas, Tex., a corporation of Delaware
Continuation-in-part of application Ser. No. 358,850, Apr. 10, 1964. This application Mar. 6, 1967, Ser. No. 633,320
15 Claims. (Cl. 71—24)

ABSTRACT OF THE DISCLOSURE

The method of producing a plant nutrient from a material containing humic acids and/or humic acid salts involving the step of contacting such material with hydrogen peroxide at a temperature in excess of a critical minimum of 140° F. The end product plant nutrient has an increased quantity of phenolics present which were converted from the humic acids and metal salts thereof during such contact. Preferably, a weak acid, such as orthophosphoric or acetic acid, and ammonia are also used in conjunction with the hydrogen peroxide during the course of processing.

---

Figure 1:
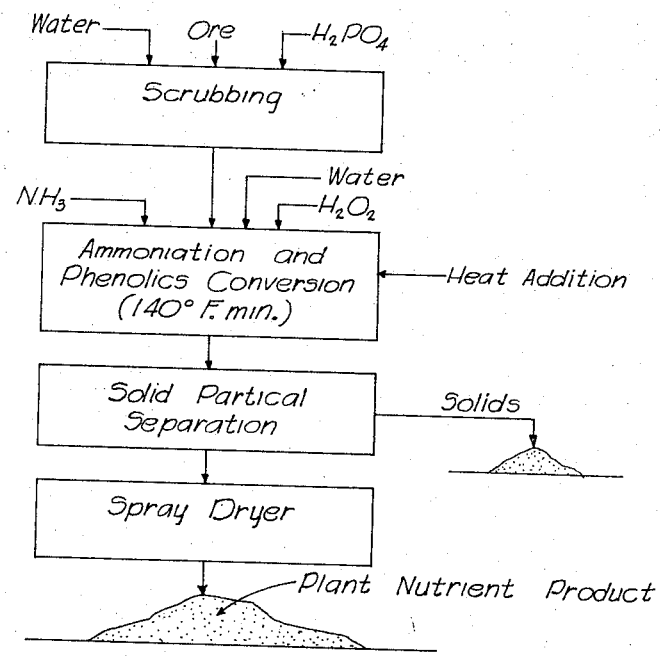

This is a continuation in part of U.S. application S.N. 358,850 filed Apr. 10, 1964, and now abandoned, entitled, Production of Plant Nutrient.

This invention relates to the production of a plant nutrient. In a more specific aspect this invention relates to the formation of a plant nutrient from ores such as leonhardite through a conversion involving hydrogen peroxide.

It is known in the art that plant growth substances may be derived from various humus-containing materials, for example, from leonhardite ore. It has now been found that these substances may be processed to accomplish a conversion to substantially enrich the product in plant nutrient value.

It has been an object of the prior art to provide fertilizer having a high concentration of humic materials. For example, see Patent No. 3,111,404, which discloses a method for making a fertilizer containing substantial quantities of humic acid from a leonhardite-type ore. That patent discloses the addition of hydrogen peroxide as an optional feature in connection with the scrubbing operation of leonhardite ores. The scrubbing operation is performed by contacting finely ground particles of leonhardite ore with acid in relatively weak solution at substantially room temperature. The purpose of this step was to replace the metal ions in metallic humates in the ore with hydrogen ions, thus converting such humates to humic acid, e.g., aluminum, iron, and calcium salts of humic acids, which are present in varying quantities of leonhardite, may be converted to humic acid by this step. Said Patent No. 3,111,404 points out that in those instances where the ore is of relatively poor quality containing a certain amount of lignitic materials not fully oxidized to leonhardite, that hydrogen peroxide could be added to the acid and finely ground ore during the conduct of the scrubbing operation. This resulted in a certain amount of oxidation of the lignitic materials to humic acid, but with no appreciable production of phenolics, as hereinafter defined. After further extensive investigation, it appears that the addition of a hydrogen peroxide contacting step can produce such phenolics provided that the step is conducted at a temperature in excess of a critical minimum of about 140° F. This phenomenon will not occur pursuant to operation under the prior patent since the critical temperature is not reached in operations conducted in accordance with its teachings.

The term phenolics is used herein to refer to certain material derived from humus substance, it being understood that "phenolics" is not used in an exact chemical sense but in the sense of designating a certain fraction of material which is rich in various phenolic compounds. The fractionation of humus, in accordance with prior art convention, is described on page 162 and schematically illustrated on page 163, Figure 5.1 of Chemistry of the Soil, Firman E. Bear (Reinhold, 1953). On the fractionation of humus, in accordance with this prior art approach, the humus material may be separated from soil organic matter by two percent sodium hydroxide solution to cause it to form a colloidal solution. From this colloidal solution the "humic" fraction is precipitated by acidifying to a pH of about 3.5, leaving a straw-yellow supernatant, the "fulvic" fraction. The fulvic fraction appears to contain large quantities of various phenols, substituted phenols and phenol derivatives, including flavones as well as various phenol oxidases. If alcohol is then added to the mixture of precipitate and supernatant in quantity such that about 4 volumes of alcohol are present per volume of the mixture, additional material in the precipitate will go into the solution. This material is, like the fulvic fraction, rich in various phenols, substituted phenols and phenol derivatives and, apparently, various phenolic oxidases. It is referred to often in the prior art as the "haematomelanic acid" fraction. The supernatant solution that results after alcohol addition is thus seen to be the combination of the fulvic acid fraction and the haematomelanic acid fraction. Since the resulting combined fraction is quite rich in phenols, substituted phenols, phenol derivatives including flavones and probably various phenolic oxidases, it is referred to hereinafter as the "phenolic fraction" and the materials in the fraction and their derivatives are designated as "phenolics." Examples of specific compounds which may be present in a given phenolic fraction are phenyl acetic acid, diphenyl acetic acid, phenoxyacetic acid, phenylacetamide, diphenylacetamide, phenoxyacetamide, betaindolacetamide and alphanaphthaleneactamide.

The phenolics are quite important as plant growth substances and as nutrients. See Enzyme Chemistry of Phenolic Compounds, Pridham (MacMillan, 1963). Their presence in substantial quantities in a fertilizer or nutrient product greatly enhances the value of that product. Thus, while humic acid is a good fertilizer and a plant nutrient of some value, when reinforced by substantial quantities of phenolics it has a much wider range of nutritional value and is, accordingly, a superior plant nutrient. For example, the leaf and fruit quality of a growing plant treated by the plant nutrient product of the instant invention are markedly improved, along with a growth stimulation effect. Thus, it will be seen that the phenolic enriched product of the instant invention is not only a plant growth substance but serves as a plant regulator and stimulator;

moreover, it serves as an antibiotic and has fungicidal properties. Because of the multiplicity of beneficial effects on plants, phenolic material in accordance with the instant invention is referred to as a "plant nutrient."

In accordance with the foregoing, it is seen that an object of the present invention is to provide a plant nutrient from a crushed ore containing metallic humates that has an enhanced value as a plant nutrient compared to the plant nutrients obtained from such ore by the processes of the prior art.

Moreover, it is an object of the present invention to provide a method for manufacturing a plant nutrient containing large quantities of plant growth substances, said plant nutrient containing a comparatively large phenolic fraction to enhance its effect as a plant nutrient.

In its broadest aspect, an object of the instant invention is to provide a method of making phenolics from humic material, particularly humic acids and the salts thereof.

In accordance with this invention, a method is provided for making phenolic enriched material from humic material by contacting the humic material with hydrogen peroxide at a critical temperature in excess of about 140° F. until at least part of the humic acids and/or salts of humic acids present in such humus material is converted to phenolic material.

Viewed in its relation to processes of the prior art, this invention adds an important step to the process of forming plant nutrient from crushed ore containing humic acids and the salts thereof wherein ore is subjected to the process of first scrubbing it in a relatively weak acid, preferably a phosphoric acid, followed by introducing the scrubbed ore as a slurry into an aqueous ammonia solution whereby a residence time is allowed to convert constituents of the ore to a plant nutrient. This new and important step comprises introducing hydrogen peroxide into contact with the ore during the course of processing and maintaining such contact between the ore and hydrogen peroxide at a temperature in excess of about 140° F. to convert ore constituents to a plant nutrient having enhanced value. Such conversion involves the chemical change of the humic acids and salts thereof to desirable phenolics.

For most economic operation, the foregoing step is preferably accomplished with a hydrogen peroxide percentage of from between 2 percent to about 20 percent, with a residence time of about 3 hours to 8 hours at a temperature ranging from about 170° F. to the boiling point of the reacting mixture (on the order of around 200° F.).

In a preferred embodiment, a method is provided for forming a nutrient from crushed leonhardite ore which has been scrubbed with phosphoric acid, which method comprises introducing a slurry of the phosphoric acid and leonhardite ore into a conversion chamber into contact with an aqueous ammonia solution and hydrogen peroxide, and maintaining the mixture of the acid, the ore, the ammonia, and the hydrogen peroxide at a temperature in excess of 140° F., but preferably at a temperature between about 170° F. and 200° F. and maintaining such contact to convert at least part of the constituents of the scrubbed ore to enrich them in the plant nutrient substances of the type described herein as phenolics.

In quite a specific aspect, the method recited in the foregoing paragraph includes the contacting of the leonhardite ore, acid, aqueous ammonia solution, and hydrogen peroxide in a pressure vessel at a pressure of about 5 to 30 pounds per square inch gauge. Moreover, an additional specific aspect includes providing hydrogen peroxide in no greater concentration than about 20 percent, based on weight of ore.

Figure 2:
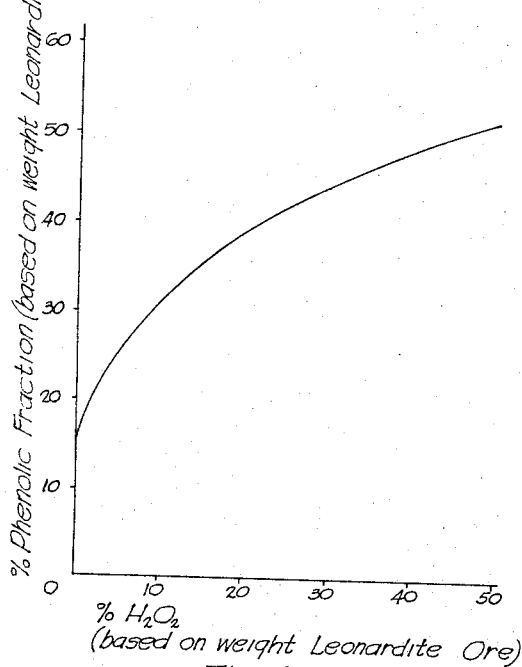
Figure 3:
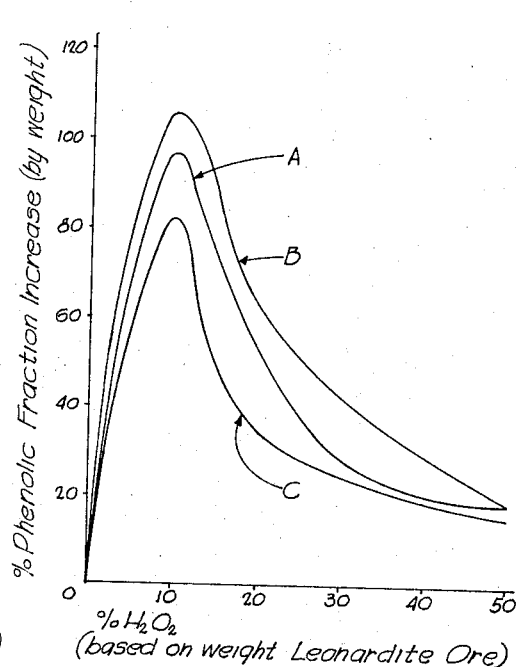

For a more complete understanding of the present invention and for further objects and advantages thereof, a reference may now be had to the following description, taken in conjunction with the accompanying drawings, in which:

FIGURE 1 is a flow diagram of the process involved in the present invention;

FIGURE 2 is a graph showing the enhancement of the product in terms of phenolics versus the quantity of hydrogen peroxide employed (both based on ore); and FIGURE 3 is a graph illustrating the efficiency of the reaction as a function of the amount of hydrogen peroxide employed and further illustrating efficiencies of production of each of two fractions of the phenolics produced in accordance with the instant invention.

Before referring in detail to the practice of the present invention, it is helpful to consider the background of the prior art in some detail. United States Patent No. 3,111,404 discloses a method of making a plant nutrient or fertilizer from an ore containing metal humates, including aluminum, calcium and iron humates. A preferred embodiment of this method comprises first finely grinding the ore, for example, to about between 80 to 300 mesh (Tyler Screen size); mixing the ground ore with an aqueous solution of orthophosphoric acid (i.e., in quantity of between about 1 percent and 5 percent by weight, based on the ore) to form a slurry; maintaining the resulting slurry, preferably while agitating it, at a preferred temperature range of from about 70° to 100° F., and for a preferred time of at least about 1 hour, during which time the aluminum, calcium, and iron is effectively replaced by hydrogen ion to form humic acid; thereafter mixing anhydrous ammonia with said slurry, e.g., in an amount equal to from about 4 percent to about 15 percent by weight of the ore in the slurry; maintaining the said slurry and ammonia in contact for a preferred period of time of at least about 5 hours, preferably while agitating, to effect reaction of humic acid with the ammonia and to form colloidally dispersed ammonium humate in the slurry; separating undesirable solid components of the said ore from the slurry; and finally subjecting the slurry containing colloidally dispersed ammonium humate to drying to obtain ammonium humate in granular form. For more detail, attention is directed to FIGURE 1 of said Patent No. 3,111,404, and the description in said patent pertaining thereto.

It is pointed out that the first two steps disclosed in the prior Patent No. 3,111,404 are particularly important in that on completion of the second step (that is, the step of ammoniation) a fertilizer product is at that time available. Other steps accomplished are for the purification and drying of the product. On modification of the process of Patent No. 3,111,404 to incorporate the practice of the present invention, it may be desirable in some instances to utilize the product of the ammoniation step as a liquid product of highly concentrated plant nutrient value. Moreover, this liquid product might be further processed in a variety of ways. Consequently, it should be appreciated that the final product of the instant invention might in some instances be the product of the ammoniation step; it might be a product obtained by treating or processing the product of the ammoniation step in various ways; or it might be a product obtained by following all of the steps described in prior Patent No. 3,111,404 subsequent to the ammoniation step to obtain a final dried product.

Referring to FIGURE 1, crushed ore and acid, preferably orthophosphoric acid, are introduced into a scrubbing vessel wherein they are maintained in intimate contact for from 1 to about 5 hours, preferably 3 to 4 hours. The temperature is preferably maintained at from 70° to 90° F. during the scrubbing process. The ore introduced into the scrubber is pre-ground into a relatively fine size, for example, between 80 and 300 mesh.

The acid is added to the ground ore as an aqueous solution of orthophosphoric acid to form a slurry. The scrubbing preferably takes place in a vessel equipped with a suitable agitator to maintain relative motion of the ore and the aqueous acid solution throughout the period of the scrubbing. During scrubbing, the metal humates, e.g., aluminum, calcium, and iron humates, are changed, for the most part, to humic acid.

After the scrubbing is completed, the acid solution and finely ground ore are transferred as a slurry to a suitable phenolic conversion container, wherein ammonia is added until the resulting slurry of liquid and small solid particles reaches a pH of from 6 to 10, preferably from 8.0 to 9.5. At any time after the scrubbing operation is completed, hydrogen peroxide is introduced in quantity preferably ranging from about 2 percent to 20 percent of the weight of the ore being processed. The addition of ammonia is so accomplished that the final pH of the slurry obtained after the combination of the initial slurry of ore and acid solution, hydrogen peroxide, and anhydrous ammonia are combined is from 6 to about 10, preferably from about 8.0 to 9.5. The entire slurry of acid, ore particles, ammonia and hydrogen peroxide is allowed to remain in contact at a temperature in excess of 140° F., preferably in excess of 170° F., but no higher than the boiling point. During this contact period, the slurry is agitated by a conventional agitator in the vessel to ensure good contact.

The contact period will vary, depending on temperature and degree of reaction desired. At a temperature slightly above the critical minimum of 140° F., the time required is several hours in order to obtain a useful amount of conversion, but at a temperature of between 170° F. and about 200° F., but a few hours, on the order of about 3 to 8, is adequate to give complete or substantially complete conversion. In many instances, complete conversion is not desired, and a much lesser period of time will be utilized for processing with the hydrogen peroxide at the higher temperatures mentioned.

After completion of the ammoniation step, described just above, the product may then be further processed in accordance with the scheme detailed in Patent No. 3,111,-404 and outlined previously herein, or if a liquid product is preferred, the drying step may be eliminated. Moreover, if desired, the product may be separated into various enriched fractions.

As an alternative embodiment of the instant invention, the hydrogen peroxide may be added so that it is present during the course of the scrubbing operation; however, this is not usually as satisfactory as addition at the time described above, probably since a buffering effect is caused by addition at this early stage.

The following examples are given as specific illustrations of the practice of this invention and it is not intended that they be taken as in any way limiting its scope.

EXAMPLE 1

Five hundred grams of leonhardite ore of between 100 and 200 mesh size are introduced into a vessel containing 500 grams of water. Fifty grams of 85% by weight orthophosphoric acid are added. The mixture is agitated in the vessel for 3 hours.

Thereafter, the entire mixture of ore, water and acid is transferred as a slurry to a pressure vessel and 1,000 grams of water are added to the vessel. Ammonia is added to the pressure vessel, preferably as anhydrous ammonia (however, ammonium hydroxide may be used), to bring the pH up to 9.2. This requires somewhat in excess of 50 grams of anhydrous ammonia.

Fifty grams of hydrogen peroxide solution, 35% $H_2O_2$ by weight, are then added to the mixture in the pressure vessel.

The mixture in the pressure vessel is heated by a steam coil passing therethrough to a temperature of about 190° F., while being thoroughly agitated. Agitation is continued for about 5 hours, during which time heat is added by means of the steam coil to maintain the temperature at approximately the 190° F. level.

At the end of 5 hours residence time at the 190° F. temperature, the slurry is processed in accordance with the scheme of processing the effluent slurry from the ammoniation step of U.S. Patent No. 3,111,404. See also FIGURE 1 hereof. In accordance with this scheme, the slurry is transferred, as by a pump, into a purifying unit (solid particle separation unit) which includes a high capacity centrifuge. Such centrifuge removes the insoluble particles from the slurry.

The effluent from the purifier unit is pumped into a mixing tank wherein chemical compounds containing nitrogen, phosphorus, potassium, and trace quantities of any other desired elements beneficial to plant growth are added from suitable storage sources into the mixing bath or in separate stages.

The resulting mixture is adjusted as to pH by addition of a quantity of phosphoric acid to bring the pH within the range of 8.0 to 9.0.

Thereafter, the mixture is delivered to the top of a spray drying tower. A fine spray of the mixture is produced at the top of the tower and air heated by a burner is drawn downward through the tower, carrying the spray with it. The dry solids are collected in the bottom of the tower. The rate of air flow, the amount of heat produced by combustion of fuel gas in the tower and the rate of mixture sprayed into the tower are so controlled that the pH of the materials collected in the bottom of the tower is about 8.0.

For detail in the foregoing steps involving removal of waste ore material, addition of supplemental plant growth substances, and spray drying, see the said U.S. Patent 3,111,404.

The solid product obtained by this example is found to be a highly effective plant nutrient.

EXAMPLE 2

Example 1 is repeated under the same conditions set out therein, except that the hydrogen peroxide contacting step in carried out with a residence time of only 30 minutes, in place of the 5 hours of Example 1. With this shorter residence time, the extent of conversion obtained is incomplete, although a substantial amount of conversion nevertheless occurs. The solid product ultimately obtained is a fertilizer of enhanced value, although it is not so rich in phenolics as the product of Example 1 since a lesser amount of conversion occurs during the processing of this Example 2 material. In some instances, a material having the lesser phenolic content, as exemplified by Example 2, would be preferred over the richer Example 1 type material, and in other instances the inverse would be true, depending on soil conditions and other conditions under which the fertilizer product is to be used.

EXAMPLE 3

The procedure of Example 1 is repeated, except that the product from the treatment in the pressure vessel receives a different ultimate treatment. Solids are removed from the product, as in the prior example, and thereafter humic acid is precipitated by acidifying the colloidal mixture to a pH of about 4.0 with phosphoric acid. The precipitate is humic acid. On filtration of the mixture, the liquid is collected. It contains the "phenolic" fraction, and is found to be highly enriched in quality plant nutrients.

The liquid containing the phenolic fraction is evaporated to dryness. This may be accomplished in a spray drying tower. The solid product obtained is a highly concentrated and enriched plant nutrient of great value. It is useful in certain applications by itself, or combined with other materials in other applications, to obtain a plant nutrient of highly desirable characteristics.

EXAMPLE 4

The procedure of Example 3 was followed with varying quantities of hydrogen peroxide. The following table shows the percent of phenolics, based on the total weight of ore sample, as a function of percent hydrogen peroxide used, the hydrogen peroxide being also given as the percentage of weight of the ore samples:

Table I.—Conversion of leonhardite

| Percent peroxide (based on weight of ore) | Percent phenolic fraction (based on weight of ore) |
| --- | --- |
| 0 | 16 |
| 5 | 24.5 |
| 10 | 31.5 |
| 20 | 39.9 |
| 30 | 44.3 |
| 40 | 48.7 |
| 50 | 51.7 |

FIGURE 2 illustrates a curve constructed from the data of Table I. It will be noted that approximately 16% of the ore sample is found to be in the phenolic fraction when hydrogen peroxide is not employed. The addition of a very modest quantity of hydrogen peroxide causes these percentages to rise very rapidly. In the range of up to about 10% hydrogen peroxide, the rate of increase of phenolic fraction as a result of hydrogen peroxide processing is quite high. The behavior of percentage increase of phenolics through addition of hydrogen peroxide can best be appreciated by referring to FIGURE 3, wherein curve A shows percentage increase of phenolics plotted as a function of the amount of hydrogen peroxide, the hydrogen peroxide being given as a percentage by weight of the leonhardite sample. The rate of increase is seen to rise until a maximum is reached at about 10% hydrogen peroxide. Thereafter, it falls off rapidly and at the 50% level, it appears that additional quantities of hydrogen peroxide have little effect on increasing yield of phenolics.

The foregoing analyses are approximate since leonhardite ores vary somewhat. In the leonhardite ore referred to in Table I, it will be noted that without the addition of hydrogen peroxide, the phenolic content ran about 16%. The total humic acid fraction on the samples ran about 55%. The initial humic content is, of course, of considerable importance since evidently the humic fraction of the samples is being converted to phenolics. For an ore with higher or lower content of humic acids and humic acid salts than that employed in the conduct of obtaining data for the tables above, it follows that a somewhat higher or lower percentage of hydrogen peroxide is desirable for best results.

It is interesting to note that the phenolic fraction produced by practice of the instant invention contains two essentially different types of phenolic materials—phenolics that are substantially oxidized and those that are not. Both the oxidized and non-oxidized phenolics appear to be of great value for specific purposes in adding to the overall value of a plant nutrient substance. Plant nutrient formed in accordance with this invention, with its resulting largely increased phenolic fraction, is found to contain substantial quantities of both the oxidized and non-oxidized phenolics. While the presence of both oxidized and non-oxidized phenolics obtainable from humus are both greatly increased in quantity by the process of this invention, the oxidized phenolics show the greatest increase. FIGURE 3 illustrates the percent increase of the oxidized phenolics (curve B) and of the non-oxidized phenolics (curve C), a separate curve being shown for each, plotted versus the percentage the hydrogen peroxide used based on the weight of leonhardite ore treated. The data for curves B and C of FIGURE 3 was attained by colorimetric analysis. In general, the non-oxidized phenolics are clear while the oxidized phenolics have a yellow to orange to red color. Colorimetric comparison may be made by comparing the color intensity of the total phenolic fraction prior to any treatment with the color intensity of the same fraction after treatment with para-nitroanaline in the presence of sodium nitrate. This chemical treatment oxidizes the non-oxidized phenolics and it is seen that the increased color intensity is a measure of the relative original quantity of non-oxidized phenolics present in the total phenolic fraction.

EXAMPLE 5

Ammonium humate is prepared by the method of U.S. Patent 3,111,404, generally described above herein (the method of Example 1, not including addition of peroxide). Ammonium humate, it will be recalled, is the product from the ammoniation step, after removal of "sludge" solids. This colloidal ammonium humate is treated as follows:

Fifty grams of commercial hydrogen peroxide (35% $H_2O_2$ by weight) are added to a pressure vessel containing the colloidal ammonium humate. The temperature is raised by the addition of sufficient hot water to bring the overall mixture to approximately 180° F. This temperature is maintained at this 180° F. level throughout processing by an internal heat coil, having thermostat control means. The pressure in the vessel is on the order of about 5 pounds per square inch gauge. The mixture is constantly agitated in the pressure vessel.

On completion of 8 hours of such processing, materials in the pressure vessel are transferred to a spray dryer. The resulting dried product from the spray dryer is found to contain a large phenolic fraction. It is a plant nutrient of substantially enhanced value.

EXAMPLE 6

Five hundred grams of leonhardite ore crushed to the size range of 200 to 300 mesh screen size are agitated in a vessel along with 500 grams of water, 50 grams of phosphoric acid (85% acid by weight) for two hours. Thereafter, the slurry is transferred to a pressure vessel and acetyl peroxide is added in quantity of about 5%, based on the weight of the ore. Also, about 1,000 grams of water are added. The mixture is allowed to agitate, while maintaining the temperature at 175° F., by steam coil, for a period of 12 hours. On completion of such processing, the slurry of solid material and liquid is separated, as by a centrifuge and filtering, to obtain a liquid and liquid-colloid phase. The liquid and liquid-colloid phases were analyzed and found to have, in aggregate, approximately a 15% phenolic fraction yield, as based on weight of total ore. A control sample, run as the foregoing, but without the use of any acetyl peroxide whatsoever, gave a phenolic fraction recovery of about 7%. Repetition of this example, but with addition of hydrogen peroxide and acetic acid in stoichiometric quantities in place of the acetyl peroxide produced a 65% yield of phenolic fraction.

The favorable results illustrated by the examples are found to occur primarily through the chemical action of hydrogen peroxide on humic fraction materials. Thus, it is seen that humic acid may be converted, to a great extent, to phenolics.

In the foregoing examples, the use of a relatively weak mineral acid was illustrated (phosphoric acid); however, an organic acid, such as acetic acid, is operative although phosphoric acid is preferred. There is indication that the hydrogen peroxide reacts with the acid materials to form an acid peroxide, which in turn, oxidizes, or by other chemical action, converts the humic materials to phenolic materials.

It has been further seen from the foregoing that most favorable results are encountered when percent of hydrogen peroxide, based on an average leonhardite sample, runs no more than about 50% by weight. There is some indication that operation at higher percentages causes destruction of some of the more desirable phenolics. Preferably, the peroxide content should not exceed about 20%, based on average humic content leonhardite ores.

The temperature of reaction during the hydrogen peroxide contacting step is seen to be critical. It has been found that reaction proceeds quite slowly at 140° F., with no measurable conversion occurring in a 10 hour reaction period at this temperature. At 10° below this temperature, no observable conversion is accomplished in a period of many days. However, at 150° F., reaction temperature, a measurable quantity of conversion occurs after a 10 hour reaction period. With further increase in temperatures, the reaction rate further increases. At temperatures of about 170°, the reaction is usually complete within about a 10 hour period, and at around 200° F., much less than 10 hours is required to obtain complete conversion. Indeed, substantial conversion is realized at these higher temperatures in a matter of minutes. To summarize, 140° F. is critical, with no measurable reaction occurring below this temperature, but with measurable reaction occurring at temperatures in excess thereof.

It should be noted that "measurable reaction," as used herein, refers to a condition where a measurable color change can be observed by a standard laboratory colorimeter, which in the case of phenolics is usually at a concentration change of on the order of 1 part per million. The description of standard colorimetric techniques usable for this purpose may be found at pages 116–120, volume 3, Colorimetric Methods of Analysis, Snell and Snell (3rd ed. 1962, D. Van Nostrand) and at pages 322 and 327–328 of volume 3A, Colorimetric Methods of Analysis, Snell and Snell (1st ed. 1961, D. Van Nostrand).

In some instances, it will be desired to obtain essentially full conversion and time of reaction will be chosen accordingly, for example, on the order of 5–10 hours at about 170° F. In other instances, only a degree of conversion will be desired, and this may be accomplished in short periods, for example, a few minutes at about 170° or higher, or a few hours at 150°, all dependent upon degree of conversion desired. But, in any event, the temperature must be chosen in excess of the critical minimum of 140° F. in order to obtain conversion in accordance with the present invention.

It is preferred that temperatures substantially in excess of 140° F. be employed since a materially longer time at temperatures just over 140° F. is required in order to accomplish what can be done in less than an hour at higher temperatures, for example, at about 200° F. Best results are obtained with a temperature between the levels of about 170° F. and the boiling point, i.e., around 200°–212° F.

To conserve ammonia and to achieve optimum operating temperatures, processing is preferably accomplished in a pressure vessel at between about 5 and 30 pounds per square inch gauge.

The present invention is not limited to processing leonhardite and ammonium humate, but is applicable to processing all humic acids and the salts thereof generally, e.g., aluminum, calcium, iron, magnesium, sodium, and potassium humates. Exemplary of humic acid and humic acid salt containing raw materials, in addition to leonhardite, which may be processed by the present invention are hasemanite and peat moss. Of course, humic acid extracts or humic acids synthetically produced may likewise be processed in accordance with the present invention.

From the foregoing it is seen that a process has been provided for converting humic material to a material with a high content of phenolics based on contacting the humic material with hydrogen peroxide at a temperature in excess of a critical level of about 140° F. Moreover, it is seen that the process has utility in manufacturing an enriched plant nutrient, and to achieve this end, a specific process is provided of contacting a leonhardite ore, previously scrubbed with acid in a preliminary scrubbing step, with hydrogen peroxide at a temperature in excess of the critical level of about 140° F. The ore and acid are preferably transferred together as a slurry from said preliminary scrubbing step to a vessel wherein they are contacted with said hydrogen peroxide, preferably in the presence of ammonia.

Having described the invention in connection with certain specific embodiments thereof, it is to be understood that further modifications may now suggest themselves to those skilled in the art and it is intended to cover such modifications as fall within the scope of the appended claims.

I claim:

1. The process of converting a humic containing material to a material having an increased content of phenolics comprising contacting a material containing a member selected from the group consisting of humic acids and humic acid salts with hydrogen peroxide at a temperature in excess of 140° F. to increase the phenolics content of said material.

2. The process of claim 1 in which an acid is present when said material is contacted with hydrogen peroxide.

3. The process of claim 1 in which an acid and ammonia are present in a solution together with said hydrogen peroxide when said material is contacted therewith, said acid being selected from the group consisting of phosphoric acid and acetic acid, and said ammonia being present in a sufficient quantity to bring the overall solution pH to between 6 and 10.

4. The process of claim 3 in which the temperature is between about 170° F. and 200° F.

5. The process of claim 4 in which said material and said acid are first contacted in a preliminary scrubbing step and thereafter treated by addition of the said ammonia.

6. The process of claim 5 in which the said ammonia is added in quantity required to bring said solution to a pH of between about 8 and 9.5.

7. The method of forming a plant nutrient which comprises the steps of:
    (a) crushing an ore containing a member selected from the group consisting of humic acids and the salts thereof;
    (b) admixing the crushed ore with an aqueous solution of orthophosphoric acid to form a slurry;
    (c) maintaining said crushed ore admixed with said aqueous solution of orthophosphoric acid whereby said orthophosphoric acid replaces metal ions of said salts with hydrogen ions to form humic acids; and
    (d) mixing ammonia and hydrogen peroxide with said slurry and maintaining the resulting mixture in contact at a temperature in excess of about 140° F., whereby the additives react with the material to increase its content of phenolics.

8. The method of claim 7 in which the hydrogen peroxide is present in a concentration no greater than about 20%, based on the weight of the ore, and in which the overall solution pH of the resulting mixture of step (d) is between about 6 and 10.

9. The method of claim 8 in which the hydrogen peroxide and ammonia are maintained in contact with said slurry in a pressure vessel at a pressure substantially no less than the vapor pressure of the resulting mixture.

10. The method of claim 9 in which said temperature of step (d) is from about 170° F. to about 200° F. and said hydrogen peroxide is present in quantity of from about 2% to about 20%, based on the weight of ore, and the said pH is between about 8 and 9.5.

11. The method of claim 9 in which the pressure in said pressure vessel is maintained at between about 5 and 30 pounds per square inch while said slurry is being processed in said pressure vessel.

12. The method of forming a plant nutrient from crushed leonhardite ore which has been scrubbed with phosphoric acid which comprises:
    (a) bringing ammonia and hydrogen peroxide into contact with said scrubbed leonhardite ore; and
    (b) maintaining the resulting mixture in slurry form at a temperature in excess of about 140° F. to convert constituents of the scrubbed ore to phenolics.

13. The method of claim 12 in which the hydrogen peroxide is present in concentration no greater than about 20%, based on the weight of the ore, and in which the pH of the slurry is between about 6 and 10.

14. The method of claim 13 in which the hydrogen peroxide and ammonia are maintained in contact with said ore in a pressure vessel at a pressure substantially no less than the vapor pressure of the resulting mixture.

15. The method of claim 14 in which the temperature of the resulting mixture is maintained between about 170° F. and 200° F. and said hydrogen peroxide is present in quantity of from about 2% to about 20%, based on the weight of the ore, and the said pH is between about 8 and 9.5.

References Cited

UNITED STATES PATENTS

| | | | |
|---|---|---|---|
| 2,093,047 | 9/1937 | Hudig | 71—24 X |
| 2,786,074 | 3/1957 | Goren | 260—515 X |
| 3,111,404 | 11/1963 | Karcher et al. | 71—24 |
| 3,259,650 | 7/1966 | Decker et al. | 260—515 |
| 3,325,275 | 7/1966 | Bratzler et al. | 71—24 X |

FOREIGN PATENTS

| | | |
|---|---|---|
| 347,641 | 4/1931 | Great Britain. |
| 642,038 | 8/1950 | Great Britain. |

OTHER REFERENCES

Arnold, C. L., et al.: "The Isolation and Study of the Humic Acids From Peat," in Bur. Mines Rept. of Investigations, vol. XIV, No. 4 (1934), pp. 107–112. (Copy in 71-Publications.)

Bailey, P. E. W., et al.: ". . . Preparation of Sub-Humic Acids From Humic Acids by Oxidation . . .," in Fuel, vol. 34, No. 1, pp. 47–49. TP 315 F 85.

Frank, N. W., et al.: ". . . Poly Carboxylic Acids by Oxidation of Coal," in Industrial and Engineering Chemistry, vol. 44, No. 11, November 1952, pp. 2784–2792. (Copy in 260-515 (H).)

DONALL H. SYLVESTER, *Primary Examiner.*

T. D. KILEY, *Assistant Examiner.*

UNITED STATES PATENT OFFICE
CERTIFICATE OF CORRECTION

Patent No. 3,377,152                     April 9, 1968

John C. Karcher

It is certified that error appears in the above identified patent and that said Letters Patent are hereby corrected as shown below:

Column 1, line 54, "of" should read -- in --. Column 1, lines 32, 36, 44, 47, 48, 54, 55 and 59, Column 3, line 51, Column 5, line 50, Column 7, lines 26, 31, 32 and 63, Column 8, lines 26, 63 and 68, Column 9, lines 47, 50, 51 and 63, and Column 10, lines 64 and 67, "leonhardite", each occurrence, should read -- leonardite --.

Signed and sealed this 23rd day of September 1969.

(SEAL)
Attest:

Edward M. Fletcher, Jr.                      WILLIAM E. SCHUYLER, JR.
Attesting Officer                              Commissioner of Patents